A. P. ANDERSON.
ART OF TREATING STARCH AND PRODUCT.
APPLICATION FILED AUG. 31, 1906.
1,035,837.
Patented Aug. 20, 1912.
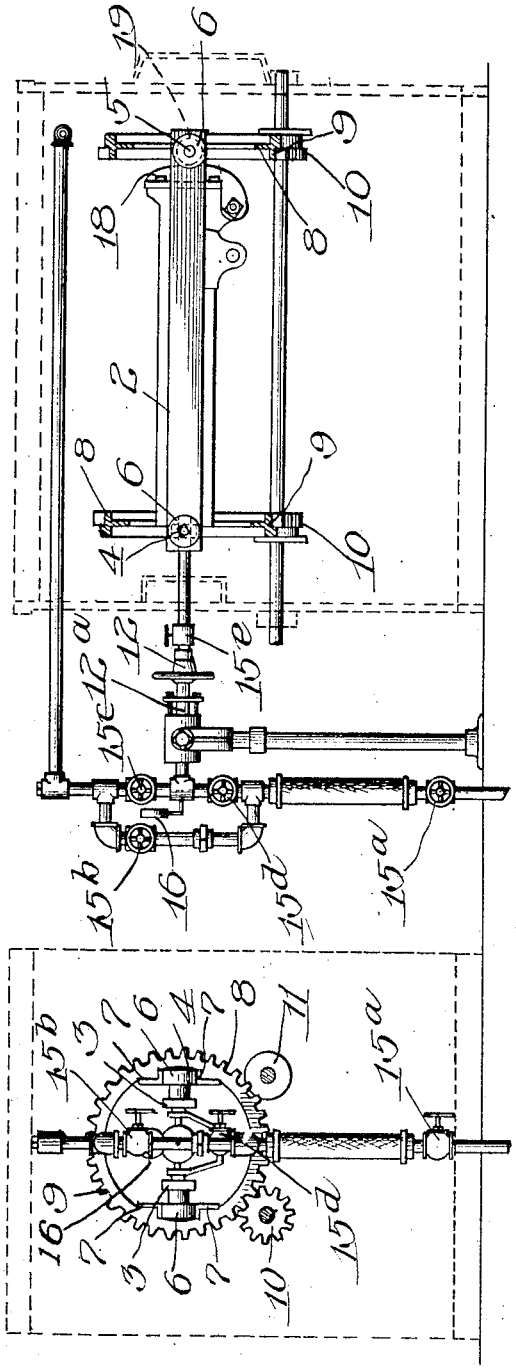
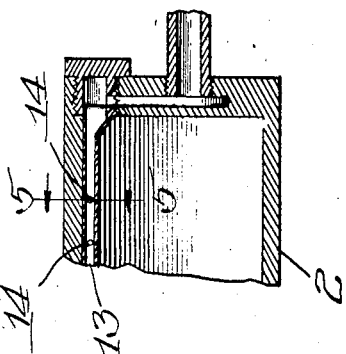
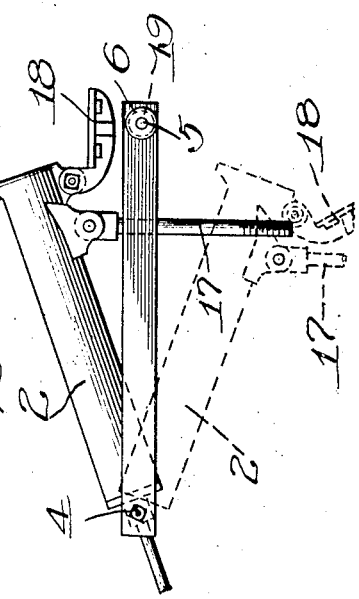
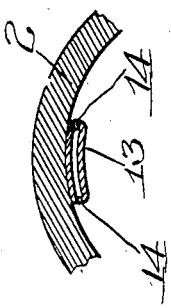
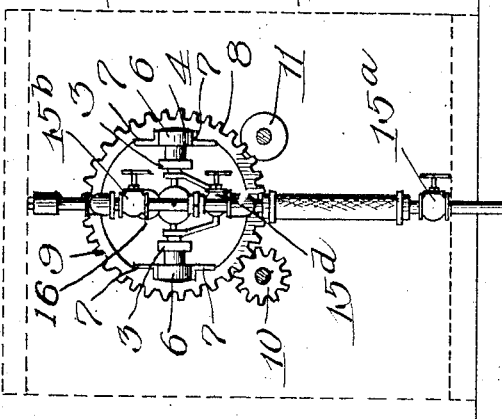
Witnesses:
S. V. Dommuz.
A. H. Lidders
Inventor:
Alexander P. Anderson
by Jones Addington Ames
Attys.

UNITED STATES PATENT OFFICE.

ALEXANDER P. ANDERSON, OF CHICAGO, ILLINOIS.

ART OF TREATING STARCH, AND PRODUCT.

1,035,837.  Specification of Letters Patent.  Patented Aug. 20, 1912.

Application filed August 31, 1906. Serial No. 332,805.

*To all whom it may concern:*

Be it known that I, ALEXANDER P. ANDERSON, a citizen of the United States, residing at Chicago, in the county of Cook and State of Illinois, have invented new and useful Improvements in the Art of Treating Starch, and Product, of which the following is a full, clear, concise, and exact description, reference being had to the accompanying drawing, forming a part of this specification.

My invention relates to improvements in the art of treating starches, and to a new starch-product.

The object of my invention is to provide a new and improved process of treating starch to obtain in a rapid, economical and efficient manner a powdered starch; and also to produce a starch product having novel and valuable characteristics.

In carrying out the process in the preferred manner, the material, such as the ordinary powdered starch of commerce or powdered starch mixed with lumps, is subjected to treatment in a closed receptacle, provision being made to heat the receptacle and preferably also to rotate the same to admit steam thereto, and withdraw vapors therefrom. Furthermore for the purpose of puffing or swelling the material, and some means might be arranged to suddenly reduce the pressure surrounding the material, though other methods of puffing might be employed. If desired the puffed product may be ground, and preferably also bolted to produce a new powdered starch.

In the accompanying drawing, I show an apparatus in which the material may be treated, up to the grinding or pulverizing stage, the latter being accomplished by any suitable mill, as is also the bolting, if the latter step be performed.

Figure 1 is a side view of the piping together with a longitudinal sectional elevation of the drum support in the oven, the latter being indicated in dotted lines; Fig. 2 is a rear end view of the arrangement shown in Fig. 1; Fig. 3 shows the drum in charging and discharging positions, the latter position being indicated in dotted lines; Fig. 4 is a sectional view of the rear end of the drum; and, Fig. 5 is a section of the drum on the line 5—5 of Fig. 4.

The raw material to be treated is put into a drum 2, mounted upon a suitable car capable of being rolled about and brought to the various parts of the apparatus for handling. The car consists of two side members 3, 3, having a trunnion 4 extending therebetween at the rear end, a shaft of axle 5 connects the forward ends of said members. Small wheels or rollers 6 are mounted outside of the members 3, upon the projecting ends of trunnion 4 and shaft 5. The cars run on a track 7 within the oven, consisting of four rails fastened to the inside of the cage 8. At each end of the oven is a ring 9 having teeth outside forming a gear, which meshes with another gear 10 to rotate the cage. The gears 10 and rollers 11 support the cage and inclosed drum, in addition to causing rotation thereof by any suitable power applied to one of their supporting shafts outside of the oven. After the drum has been run into the oven, a steam-connection is made at 12, thus admitting steam to the flattened pipe 13 inside of the drum. The steam escapes into the drum through numerous holes 14 in the pipe, said holes becoming more frequent in proportion to the drop in pressure as the steam advances.

By means of the gears 9 and 10 the cage containing the drum is rotated slowly during the heating. Rotation is permitted by the stuffing box 12$^a$, which at the same time maintains the steam-connection. The arrangement of the piping shown is as follows; 15$^a$, 15$^b$, 15$^c$, 15$^d$ and 15$^e$ are valves; 16 is a pressure gage. By opening valves 15$^b$, 15$^a$, and closing valves 15$^d$, 15$^c$, the steam is by-passed around the drum. By closing the valve 15$^b$ and opening valve 15$^c$, the pressure in the drum may be brought to any desired point, as shown by gage 16. To reduce the pressure in the drum, valve 15$^c$ may be closed, and 15$^d$ opened, whereby the pressure escapes into the atmosphere. Thus, by proper valve-manipulation the conditions of pressure and temperature in the drum may be regulated and controlled absolutely within the desired limits. It will be understood that the oven is heated by any suitable or desired means,—as, for example, by gas.

The lid 18 of the drum is clamped tightly closed, a suitable soft-metal gasket being provided to cause an air-tight connection when the drum is in the horizontal position in its frame. In order that the heating may not unseal the lid, I prefer to make the drum of bronze, or some material having a higher coefficient of expansion than the side members of the frame.

To remove the drum from the oven after the heating, valve 15ᵉ is closed, the drum is disconnected at 12, and is run out of the oven to a raising and lowering mechanism suitably connected with the drum through the arm 17. By means of this mechanism the drum is lowered about the shaft 4 as a pivot, as indicated in dotted lines in Fig. 3. The lid 18, previously held shut by the roller 19, suddenly flies open from internal pressure, and the contents are discharged, assisted by gravity, and at the same time puff up in size. The puffed product is discharged with considerable force into a receptacle or cage many times the volume of the drum. In charging, the drum is raised by the same arm or screw 17 until it tilts upwardly, when the material to be treated may be fed into the drum.

For the purpose of making a full and complete disclosure of my invention, I shall describe in detail the preferred manner of carrying out the process, at the same time realizing that variations may be made therein without departing from the scope or principle of the invention.

The starch in a comminuted form,—that is to say, in the form of powder, or lumps, or powder and lumps mixed, and containing preferably about 15 to 25% of water, is put into the drum in quantity sufficient to fill the same about one-half to three-fourths full. Freshly made starch dried out until it contains this amount of water may be used, or the extra percentage of water may be added to air-dry starch in any suitable way,—as, for example, by spraying the water upon the starch while it is being agitated, so as to well mix it with the starch. I have found that when the water is added to air-dry starch a convenient method of distributing it evenly enough for the purpose, is to run the whole through a sieve with a mesh of about one-quarter inch diameter.

After the starch has been placed in the drum the latter is sealed air-tight by closing the lid and clamping it in position as explained in connection with the drawing, after which the drum is placed in the oven and is rotated while being heated, the oven heat during this treatment being about 200° to 250° C. On account of the rotation of the cylinder, the starch is kept continually tumbling, and owing to the heat, gives off part of its moisture in the form of steam whereby it soon becomes surrounded by an atmosphere of steam, the temperature of which is naturally greater than that of the starch; likewise, the temperature of the walls of the drum is higher than that of the starch. Accordingly, the confined steam condenses on and throughout the starch, again evaporates, and then recondenses, this operation being continuously repeated. The surface or periphery of the starch balls, nodules or pebbles that are now forming, is more moist than the inside of the same, the moisture even gathering upon the lumps in the form of free water of "sweat". This moisture gathers up the loose starch powder, and owing to the heat and moisture, together with the tumbling action to which the starch is subjected, the starch is all rolled up into lumps which may well be described as nodular or pebble-like, the latter terminology being preferred. During this stage of the treatment which we may term the pebbling stage of the process, a pressure of about 30 to 40 pounds per square inch develops within the cylinder in about 40 minutes, the time varying with that of the oven temperature. At this pressure, all of the starch has pebbled into lumps of greater or less hardness, depending largely upon the amount of water that the starch contained when put into the drum, it being apparent that when the starch contains say 25% of water gelatinization to a greater extent takes place than when it contains say 15% of water; also, the more extensive the gelatinization, the harder the pebbles. Although all of the starch at the end of this stage has been formed into pebbles as explained, this treatment is continued about 10 to 20 minutes longer or until a pressure of about 60 pounds per square inch develops within the cylinder. At this pressure, the starch lumps are at a temperature of about 125° to 150° C., and have become greatly hardened by the fusion and coalescence of the starch granules of which the lumps are composed. The blow-off valve of the drum is now opened slowly, that is, partly at first, and then fully open, and the pressure of the drum is thus allowed to fall slowly to zero in about 1 or 2 minutes. The blow-off is continued for about 3 minutes. The object of blowing out all of the pressure of the cylinder is to get rid of the moisture upon the pebbles to prevent them from sticking together, and also to deodorize the starch by ridding it of the corn odor (when corn starch is treated) as well as of any other deleterious odors due to oils, etc., which are present in the starch, and are volatile at this temperature.

It is apparent that during the blowing off, the starch pebbles lose considerable of their moisture, which passes out as steam. The blow-off should be continued long enough so as to leave the lumps free from any excess of moisture, as explained, but should not be continued so long that they become too dry, in which case, there would not be sufficient moisture to carry out the next step of the process, to-wit, their swelling or puffing. It has been found that the time given above for the blow-off is about right. The drum during the whole process is preferably kept in continuous rotation, although a short stoppage would do no harm. As soon as the blow-off is completed, the valve at the end of the drum is closed, and steam is admitted to the drum by opening the steam-injection valve. The admission of steam follows immediately upon the blowing off of the pressure above referred to, and preferably not more than a minute thereafter. The pressure of the steam injected should for best results be about 175 pounds per square inch. This steam should be dried, and if slightly superheated to insure dryness, is still better. The steam is admitted until the pressure within the drum is raised to about 130 pounds per square inch. When this pressure has been reached, the steam is cut off, whereupon, the pressure falls somewhat to about 120 pounds per square inch, which should occur in about two minutes. This decrease in pressure is due to a condensation of the steam on and inside of the pebbles. The pressure within the drum is now suddenly reduced—as, for example by opening the lid and discharging the material from the drum as quickly as possible. In this way, the starch pebbles are swelled or puffed to many times their prior size, and are rendered porous and suitable for many purposes. Thereafter I prefer to pulverize and preferably also to bolt this swelled or puffed starch in any suitable manner. This is readily done as soon as it is cooled or dried out enough to give the swelled or puffed starch lumps a certain crispness, which results in a rapid pulverization to fine powder.

Instead of beginning the operation as above described with the starch powder of commerce, I may take the starch which has previously been pebbled, for example, the pebbles which have been formed at the end of the first step in the above recited process when the cylinder pressure was at about 30 to 40 pounds, and which have been taken out of the cylinder after a slow reduction of the pressure through the blow-off valve. This product corresponds with that described and claimed in my application Serial No. 332,804, filed August 31, 1906. This pebbled starch, which should contain from about 15 to 25% of moisture is put into the drum in amount sufficient to fill the same about one-half or three-fourths. The cylinder is then sealed air-tight and heated until a pressure of about 60 pounds per square inch develops therewithin. This pressure is then blown off slowly through the blow-off valve and for a time sufficient to give the starch pebbles the desired dryness, when the valve is again closed and dry steam at about 175 pounds per square inch admitted until the pressure within the cylinder reaches about 130 pounds as determined by the pressure-gage. The steam-injection valve is now closed, the steam within the drum condensing on and inside of the starch pebbles, for which reason the pressure within the drum varies to about 120 pounds in from one to two minutes. This pressure is then suddenly reduced, as before described, and the starch is discharged from the drum as quickly as possible, at the same time swelling or puffing to many times its original volume. After this swelled starch is exposed to the air for a short time, it is pulverized and preferably bolted to produce the new starch powder. This new powdered product as finally obtained from the preferred process, is a powder which when examined, microscopically, even with low magnifying powers, appears different from the ordinary prior starch powder in that the particles of which it is composed are irregular in shape and largely leaf-like, the latter being transparent when viewed by transmitted light. It contains large numbers of leaf-like disks, and some remains of torn and distorted cells of the puffed lumps. Also, on account of being flaky and leaf-like when thrown or blown into the air, it does not immediately settle, but floats down somewhat slowly and scatters over a large area. Furthermore, as thus made, the new powder has been purified by deodorization, whereas prior forms of corn starch have retained more or less of the smell of corn-oil. In taste, also, this absence of the flavor of corn oil or other unpleasant flavors is noticeable, and this is true as well when the new powder is made from starches other than corn starch. Also, owing to its fluffiness, the new starch is soft as compared with the harsh or squeaky feeling of other starches. When not compressed, the new powder occupies greater bulk, approximately twice that of the same weight of the ordinary starch-powder or flour. In other words, my new starch-powder has a weight per volume of approximately one-half that of raw or ordinary starch-powder. In bulk, it is more or less elastic, so that when placed in a receptacle, it may be compressed to a considerable extent, and when the pressure is removed, it tends to spring back to substantially its original volume.

As thus made, it is substantially pure starch, and is taken up quickly by either cold or warm water to form a paste similar to boiled starch-paste,—that is, starch gelatinized by boiling in water. It differs, however, from the ordinary starches, in that it forms a thin jelly or paste with cold or warm water without any boiling. It is therefore a soluble starch, and makes an ideal thin-boiling starch-substitute, because it can be mixed quickly with either cold or hot water. It is furthermore soluble in cold or hot syrups such as glucose or molasses, without prior boiling, forming therewith a doughy, pasty, adhesive mass, more or less elastic without the addition of water other than that contained in the syrups. For this reason, it may be used in the finest kinds of laundry work, or for other purposes where other starches having a high fluidity are necessary. The fluidity of my new starch when dissolved in cold or warm water is high, being about the same as that of ordinary thin-boiling starches, when such starches have been gelatinized in boiling water. When, however, my product thus described is dissolved and boiled like a thin-boiling starch, its fluidity becomes as high or even higher than that of the usual thin-boiling starches that have a high fluidity. On account of its being substantially a pure starch, its chemical reactions are essentially the same as those of prior starch-paste. Also, it is adhesive when wetted, and its starch granules are disrupted. The fact that the starch granules have substantially all been broken up or disrupted makes it substantially different from other starch powders.

Having thus described my invention, what I claim as new and desire to secure by Letters Patent, is:

1. The herein described sub-process which consists in heating and tumbling the comminuted material containing about 15 to 25 per cent. moisture in a closed receptacle until adhesive nuclei or centers are formed throughout the material, then continuing the heating and tumbling until substantially all of the loose material has been gathered up by the nuclei or centers into pebble-like lumps, then slowly reducing the pressure within the receptacle, then subjecting the lumps thus formed to the action of steam under pressure, and then suddenly reducing this pressure, whereby the lumps become puffed.

2. The herein described sub-process which consists in heating and tumbling the comminuted material containing about 15 to 25 per cent. moisture in a closed receptacle until adhesive nuclei or centers are formed throughout the material, then continuing the heating and tumbling until substantially all of the loose material has been gathered up by the nuclei or centers into pebble-like lumps, then slowly reducing the pressure within the receptacle, then subjecting the lumps thus formed to the action of dry steam under pressure, and then suddenly reducing this pressure, whereby the lumps become puffed.

3. The herein described sub-process which consists in heating and tumbling the comminuted material containing about 15 to 25 per cent. moisture in a closed receptacle until adhesive nuclei or centers are formed throughout the material, then continuing the heating and tumbling until substantially all of the loose material has been gathered up by the nuclei or centers into pebble-like lumps, then slowly reducing the pressure within the receptacle, then subjecting the lumps thus formed to the action of superheated steam under pressure, and then suddenly reducing this pressure, whereby the lumps become puffed.

4. The herein described sub-process which consists in heating and tumbling the comminuted material containing about 15 to 25 per cent. moisture in a closed receptacle until a pressure of about 30 to 50 pounds per square inch has developed within the receptacle, whereby substantially all of the material is gathered up into pebble-like lumps, then slowly reducing the pressure within the receptacle, then subjecting the lumps thus formed to the action of steam until a pressure of about 130 pounds per square inch has developed within the receptacle, and then suddenly reducing this pressure, whereby the lumps become puffed.

5. The herein described sub-process which consists in heating and tumbling the comminuted material contained about 15 to 25 per cent. moisture in a closed receptacle until a pressure of about 30 to 50 pounds per square inch has developed within the receptacle, whereby substantially all of the material is gathered up into pebble-like lumps, then slowly reducing the pressure within the receptacle, then subjecting the lumps thus formed to the action of dry steam until a pressure of about 130 pounds per square inch has developed within the receptacle, and then suddenly reducing this pressure, whereby the lumps become puffed.

6. The herein described sub-process which consists in heating and tumbling the comminuted material containing about 15 to 25 per cent. moisture in a closed receptacle until a pressure of about 30 to 50 pounds per square inch has developed within the receptacle, whereby substantially all of the material is gathered up into pebble-like lumps, then slowly reducing the pressure within the receptacle, then subjecting the lumps thus formed to the action of superheated steam until a pressure of about 130 pounds per square inch has developed within the receptacle, and then suddenly reducing this pressure, whereby the lumps become puffed.

7. The process of making powdered starch which consists in heating and tumbling the comminuted material containing about 15 to 25 per cent. moisture in a closed receptacle until adhesive nuclei or centers are formed throughout the material, then continuing the heating and tumbling until substantially all of the loose material is gathered up by the nuclei or centers into pebble-like lumps, then slowly reducing the pressure within the receptacle, then subjecting the lumps thus formed to the action of steam under pressure, then suddenly reducing this pressure, whereby the lumps become puffed, and then pulverizing the puffed product.

8. The process of making powdered starch which consists in heating and tumbling the comminuted material containing about 15 to 25 per cent. moisture in a closed receptacle until adhesive nuclei or centers are formed throughout the material, then continuing the heating and tumbling until substantially all of the loose material is gathered up by the nuclei or centers into pebble-like lumps, then slowly reducing the pressure within the receptacle, then subjecting the lumps thus formed to the action of dry steam under pressure, then suddenly reducing this pressure, whereby the lumps become puffed and then pulverizing the puffed product.

9. The process of making powdered starch which consists in heating and tumbling the comminuted material containing about 15 to 25 per cent. moisture in a closed receptacle until adhesive nuclei or centers are formed throughout the material, then continuing the heating and tumbling until substantially all of the loose material is gathered up by the nuclei or centers into pebble-like lumps, then slowly reducing the pressure within the receptacle, then subjecting the lumps thus formed to the action of superheated steam under pressure, then suddenly reducing this pressure, whereby the lumps become puffed, and then pulverizing the puffed product.

10. The process of making powdered starch which consists in heating and tumbling the comminuted material containing about 15 to 25 per cent. moisture in a closed receptacle until a pressure of about 30 to 50 pounds per square inch has developed within the receptacle, whereby substantially all of the material is gathered up into pebble-like lumps, then slowly reducing the pressure within the receptacle, then subjecting the lumps thus formed to the action of steam until a pressure of about 130 pounds per square inch has developed within the receptacle, then suddenly reducing this pressure, whereby the lumps become puffed, and then pulverizing the puffed product.

11. The process of making powdered starch which consists in heating and tumbling the comminuted material containing about 15 to 25 per cent. moisture in a closed receptacle until a pressure of about 30 to 50 pounds per square inch has developed within the receptacle, whereby substantially all of the material is gathered up into pebble-like lumps, then slowly reducing the pressure within the receptacle, then subjecting the lumps thus formed to the action of dry steam until a pressure of about 130 pounds per square inch has developed within the receptacle, then suddenly reducing this pressure, whereby the lumps become puffed, and then pulverizing the puffed product.

12. The process of making powdered starch which consists in heating and tumbling the comminuted material containing about 15 to 25 per cent. moisture in a closed receptacle until a pressure of about 30 to 50 pounds per square inch has developed within the receptacle, whereby substantially all of the material is gathered up into pebble-like lumps, then slowly reducing the pressure within the receptacle, then subjecting the lumps thus formed to the action of superheated steam until a pressure of about 130 pounds per square inch has developed within the receptacle, then suddenly reducing this pressure, whereby the lumps become puffed, and then pulverizing the puffed product.

13. As a new article of manufacture, a starch-powder having in loose form a weight per volume of approximately one-half that of raw starch-powder.

14. As a new article of manufacture, a starch-powder which in bulk is elastic.

15. As a new article of manufacture, a starch-powder having in loose form a weight per volume of approximately one-half that of raw starch, and which in bulk is elastic.

16. As a new article of manufacture, a powdered starch in which the starch-granules are substantially all disrupted and broken up.

17. As a new article of manufacture, a starch-powder soluble in cold or warm water to make a solution corresponding in fluidity to thin-boiling starches of average fluidity.

18. As a new article of manufacture, a starch-powder which when boiled in water makes a solution corresponding in fluidity to thin-boiling starches of high fluidity.

19. As a new article of manufacture, starch in the form of a fluffy powder having its granules disrupted.

20. As a new article of manufacture, starch in the form of a fluffy powder having its granules disrupted, and having in loose form a weight per volume of approximately one-half that of raw starch-powder.

21. As a new article of manufacture, starch in the form of a fluffy powder having large numbers of leaf-like disks or flakes.

22. As a new article of manufacture, a deodorized starch-powder.

23. As a new article of manufacture, a deodorized starch-powder whose granules are substantially all disrupted or broken up.

24. As a new article of manufacture, a starch powder soluble in cold or hot syrups, such as glucose or molasses, forming therewith an adhesive paste.

25. As an article of manufacture, a starch powder having in loose form a weight per volume of approximately one half that of raw starch powder, which in bulk is elastic and in which the starch granules are substantially all disrupted and broken up, and which is soluble in cold or warm water.

In witness whereof, I have hereunto subscribed my name in the presence of two witnesses.

ALEXANDER P. ANDERSON.

Witnesses:
J. JAY SMITH,
JAMES RIDEOUT.